(12) United States Patent
Yoon et al.

(10) Patent No.: US 11,128,419 B2
(45) Date of Patent: Sep. 21, 2021

(54) REFERENCE SIGNAL RECEPTION METHOD AND USER EQUIPMENT, AND REFERENCE SIGNAL TRANSMISSION METHOD AND BASE STATION

(71) Applicant: LG Electronics Inc., Seoul (KR)

(72) Inventors: Sukhyon Yoon, Seoul (KR); Kijun Kim, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 16/499,971

(22) PCT Filed: Apr. 3, 2018

(86) PCT No.: PCT/KR2018/003890
§ 371 (c)(1),
(2) Date: Oct. 1, 2019

(87) PCT Pub. No.: WO2018/186647
PCT Pub. Date: Oct. 11, 2018

(65) Prior Publication Data
US 2021/0105111 A1    Apr. 8, 2021

Related U.S. Application Data

(60) Provisional application No. 62/481,085, filed on Apr. 3, 2017.

(51) Int. Cl.
*H04W 72/04* (2009.01)
*H04L 5/00* (2006.01)
(Continued)

(52) U.S. Cl.
CPC ......... *H04L 5/0048* (2013.01); *H04B 7/0626* (2013.01); *H04W 24/08* (2013.01);
(Continued)

(58) Field of Classification Search
CPC .. H04W 24/08; H04W 72/042; H04L 5/0048; H04B 7/0626
See application file for complete search history.

(56) References Cited

U.S. PATENT DOCUMENTS

2011/0176634 A1* 7/2011 Yoon ................ H04L 5/0048
375/295
2013/0114535 A1* 5/2013 Ng ................... H04L 5/0005
370/329

(Continued)

OTHER PUBLICATIONS

Huawei, HiSilicon, "Reference Signal for tine time and frequency tracking", 3GPP TSG RAN WG1 Meeting #88bis, Apr. 3-7, 2017, R1-1704242.
(Continued)

*Primary Examiner* — Chi Ho A Lee
(74) *Attorney, Agent, or Firm* — Dentons US LLP

(57) ABSTRACT

A base station transmits low-density configuration information and high-density configuration information on a channel state information-reference signal (CSI-RS) of a beam. A user equipment performs beam measurement, using a CSI-RS received on the basis of the low-density configuration information (hereinafter, a low-density CSI-RS), and performs time tracking, using a CSI-RS received on the basis of the high-density configuration information (hereinafter, a high-density CSI-RS). At least in a frequency domain, the high-density CSI-RS is configured to have a higher density than that of the low-density CSI-RS.

12 Claims, 9 Drawing Sheets

(51) Int. Cl.
*H04B 7/06* (2006.01)
*H04W 24/08* (2009.01)

(52) U.S. Cl.
CPC ...... *H04W 72/042* (2013.01); *H04W 72/0446* (2013.01); *H04W 72/0453* (2013.01)

(56) References Cited

U.S. PATENT DOCUMENTS

| | | | |
|---|---|---|---|
| 2013/0163501 A1* | 6/2013 | Chen | H04L 27/2607 370/312 |
| 2013/0163530 A1* | 6/2013 | Chen | H04W 72/04 370/329 |
| 2015/0381331 A1 | 12/2015 | Kim et al. | |
| 2016/0269978 A1* | 9/2016 | Bashar | H04W 16/14 |
| 2018/0131492 A1* | 5/2018 | Wilson et al. | H04L 5/0023 |
| 2018/0331860 A1* | 11/2018 | Bergman | H04L 5/0048 |
| 2019/0229870 A1* | 7/2019 | Wu | H04L 27/2613 |
| 2020/0028640 A1* | 1/2020 | Yeo | H04L 5/0051 |
| 2020/0228180 A1* | 7/2020 | Zhang | H04L 5/0023 |

OTHER PUBLICATIONS

ZTE, ZTE Microelectronics, "Discussion on fine time/frequency tracking of channel", 3GPP TSG RAN WG1 Meeting #88bis, Apr. 3-7, 2017, R1-1704417.

Intel Corporation, "On RS for Time/Frequency Offset Tracking", 3GPP TSG-RAN WG1 #88bis, Apr. 3-7, 2017, R1-1704739.

LG Electronics, "On CSI-RS design for beam management", 3GPP TSG RAN WG1 Meeting #88bis, Apr. 3-7, 2017, R1-1704885.

* cited by examiner

REFERENCE SIGNAL RECEPTION METHOD AND USER EQUIPMENT, AND REFERENCE SIGNAL TRANSMISSION METHOD AND BASE STATION

This application is the National Stage filing under 35 U.S.C. 371 of International Application No. PCT/KR2018/003890, filed on Apr. 3, 2018, which claims the benefit of U.S. Provisional Application No. 62/481,085, filed on Apr. 3, 2017, the contents of which are all hereby incorporated by reference herein in their entirety.

TECHNICAL FIELD

The present disclosure relates to a wireless communication system and, more particularly, to a method and apparatus for transmitting/receiving a reference signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

In addition, with advances in smart devices, a new method of efficiently transmitting/receiving small volumes of data or efficiently transmitting/receiving less frequently generated data is needed.

In addition, a signal transmission/reception method is required in the system supporting new radio access technologies using high frequency bands.

The technical objects that can be achieved through the present disclosure are not limited to what has been particularly described hereinabove and other technical objects not described herein will be more clearly understood by persons skilled in the art from the following detailed description.

Technical Solution

According to an aspect of the present disclosure, provided herein is a method of receiving a reference signal by a user equipment (UE) in a wireless communication system. The method includes: receiving low-density configuration information and high-density configuration information regarding a channel state information reference signal (CSI-RS) of a beam; performing beam measurement using a CSI-RS received based on the low-density configuration information (hereinafter, a low-density CSI-RS); and performing time tracking using a CSI-RS received based on the high-density configuration information (hereinafter, a high-density CSI-RS). The high-density CSI-RS may have a higher density at least in a frequency domain than the low-density CSI-RS.

In another aspect of the present disclosure, provided herein is a method of transmitting a reference signal by a base station (BS) in a wireless communication system. The method includes: transmitting low-density configuration information and high-density configuration information regarding a channel state information reference signal (CSI-RS) of a beam; transmitting a CSI-RS according to the low-density configuration information (hereinafter, a low-density CSI-RS); and transmitting a CSI-RS according to the high-density configuration information (hereinafter, a high-density CSI-RS). The high-density CSI-RS may have a higher density at least in a frequency domain than the low-density CSI-RS.

In another aspect of the present disclosure, provided herein is a user equipment (UE) for receiving a reference signal in a wireless communication system. The UE includes a radio frequency (RF) unit, and a processor configured to control the RF unit. The processor is configured to: control the RF unit to receive low-density configuration information and high-density configuration information regarding a channel state information reference signal (CSI-RS) of a beam; perform beam measurement using a CSI-RS received based on the low-density configuration information (hereinafter, a low-density CSI-RS); and perform time tracking using a CSI-RS received based on the high-density configuration information (hereinafter, a high-density CSI-RS). The high-density CSI-RS may have a higher density at least in a frequency domain than the low-density CSI-RS.

In another aspect of the present disclosure, provided herein is a base station (BS) for transmitting a reference signal in a wireless communication system. The BS includes a radio frequency (RF) unit, and a processor configured to control the RF unit. The processor is configured to: control the RF unit to transmit low-density configuration information and high-density configuration information regarding a channel state information reference signal (CSI-RS) of a beam; control the RF unit to transmit a CSI-RS according to the low-density configuration information (hereinafter, a low-density CSI-RS); and control the RF unit to transmit a CSI-RS according to the high-density configuration information (hereinafter, a high-density CSI-RS). The high-density CSI-RS may have a higher density at least in a frequency domain than the low-density CSI-RS.

In each aspect of the present disclosure, frequency tracking using the high-density CSI-RS may be performed. The high-density CSI-RS may have a higher density in a time domain than the low-density CSI-RS.

In each aspect of the present disclosure, the high-density CSI-RS may be a periodic CSI-RS.

In each aspect of the present disclosure, the UE may receive downlink control information including information indicating transmission of an aperiodic CSI-RS from the BS. The downlink control information may include information indicating whether the aperiodic CSI-RS is the low-density CSI-RS or the high-density CSI-RS.

In each aspect of the present disclosure, the UE may receive downlink control information including information indicating transmission of an aperiodic CSI-RS from the BS. The high-density CSI-RS configuration information may include information about a slot in which the high-density CSI-RS can be present.

The above technical solutions are merely some parts of the embodiments of the present disclosure and various embodiments into which the technical features of the present disclosure are incorporated can be derived and understood by persons skilled in the art from the following detailed description of the present disclosure.

Advantageous Effects

According to the present disclosure, uplink/downlink signals can be efficiently transmitted/received. Therefore, overall throughput of a radio communication system can be improved.

According to an embodiment of the present disclosure, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
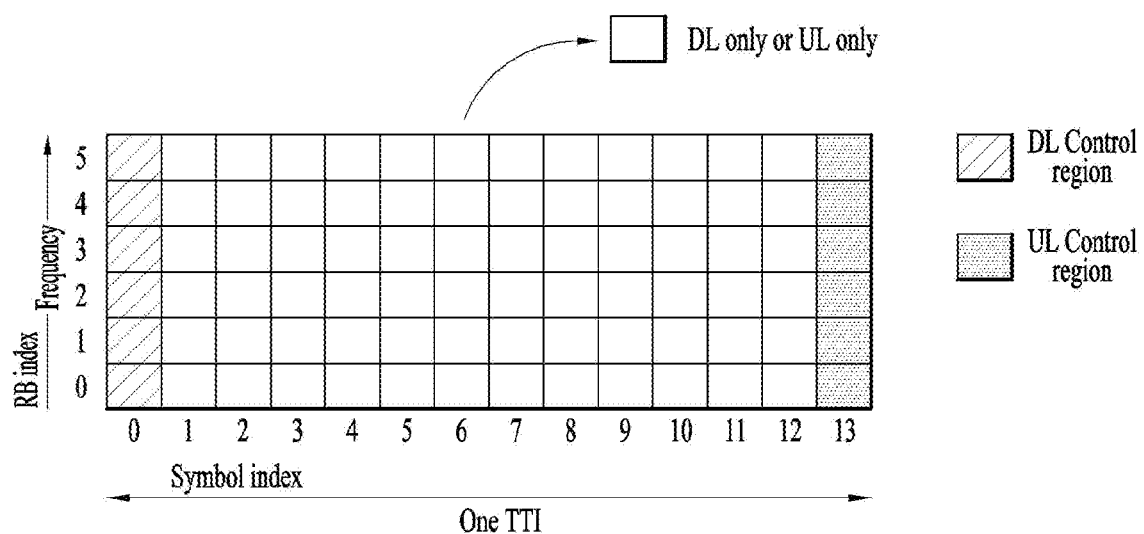
FIG. 1 illustrates a slot structure available in a new radio access technology (NR).

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the invention. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present disclosure is applied to 3GPP based communication system, e.g. LTE/LTE-A, NR. However, the technical features of the present disclosure are not limited thereto. For example, although the following detailed description is given based on a mobile communication system corresponding to a 3GPP LTE/LTE-A/NR system, aspects of the present disclosure that are not specific to 3GPP LTE/LTE-A/NR are applicable to other mobile communication systems.

For example, the present disclosure is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present disclosure described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present disclosure, puncturing a channel on a specific time/frequency resource means that the signal of the channel is mapped to the specific time/frequency resource in the procedure of time/frequency resource mapping of the channel, but a portion of the signal mapped to the punctured time/frequency resource is excluded in transmitting the channel. In other words, the specific time/frequency resource which is punctured is counted as a time/frequency resource for the channel in the procedure of time/frequency resource mapping of the channel, a signal mapped to the specific time/frequency resource among the signals of the channel is not actually transmitted. The receiver of the channel receives, demodulates or decodes the channel, assuming that the signal mapped to the specific time/frequency resource is not transmitted. On the other hand, rate-matching of a channel on a specific time/frequency resource means that the channel is never mapped to the specific time/frequency resource in the procedure of time/frequency resource mapping of the channel, and thus the specific time/frequency resource is not used for transmission of the channel. In other words, the rate-matched time/frequency resource is not counted as a time/frequency resource for the channel in the procedure of time/frequency resource mapping of the channel. The receiver of the channel receives, demodulates, or decodes the channel, assuming that the specific rate-matched time/frequency resource is not used for mapping and transmission of the channel.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present disclosure, a BS will be referred to as a gNB.

In the present disclosure, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present disclosure, a cell refers to a prescribed geographical area to which one or more nodes provide a communication service. Accordingly, in the present disclosure, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present disclosure, both a DMRS and a UE-RS refer to RSs for demodulation and, therefore, the terms DMRS and UE-RS are used to refer to RSs for demodulation.

For terms and technologies which are not described in detail in the present disclosure, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). After the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

A random access procedure is categorized into a contention-based procedure and a dedicated (i.e., non-contention-based) procedure. The contention-based random access procedure is generally used including initial access and the dedicated random access procedure is limitedly used for handover etc. In the contention-based random access procedure, the UE randomly selects an RACH preamble sequence. Accordingly, a plurality of UEs may simultaneously transmit the same RACH preamble sequence. Then, a contention resolution procedure is subsequently needed. In contrast, in the dedicated random access procedure, the UE uses an RACH preamble sequence that the eNB has uniquely allocated to the UE. Therefore, the UE may perform the random access procedure without collision with other UEs.

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present disclosure, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<Waveform, Numerology, and Frame Structure>

An NR system uses an OFDM transmission scheme or a transmission scheme similar thereto. For example, in the NR system, a DL transmission waveform is a conventional OFDM using a cyclic prefix (CP). A UL transmission waveform is a conventional OFDM using the CP with a transform precoding function performing discrete Fourier transform (DFT) spreading that can be disabled or enabled.

The NR system may use OFDM numerologies of the following table.

TABLE 1

| Parameter | Value |
| --- | --- |
| Subcarrier-spacing ($\Delta f$) | 60 kHz |
| OFDM symbol length | 16.33 us |
| Cyclic Prefix (CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

The NR system may conform to OFDM parameters different from OFDM parameters of LTE. Alternatively, although the NR system may conform to numerologies of legacy LTE/LTE-A, the NR system may have a wider system bandwidth (e.g., 100 MHz). Alternatively, one cell may support a plurality of numerologies. That is, UEs operating with different numerologies may co-exist within one cell.

For example, in the NR system, the numerology is based on an exponentially scalable subcarrier spacing $\Delta f=2^\mu*15$ kHZ with $\mu=\{0,1,3,4\}$ for a PSS, an SSS, and a PBCH and $\mu=\{0,1,2,3\}$ for other channels. A normal CP is supported for all subcarrier spacings and an extended CP is supported for $\mu=2$. In the NR system, 12 consecutive subcarriers in the frequency domain form a physical resource block (PRB). Up to 275 PRBs are supported on a carrier. In the NR system, the UE is configured with a carrier bandwidth part that defines the operating bandwidth of the UE within the operating bandwidth of a cell. For initial access and until configuration of the UE in the cell is received, an initial bandwidth part detected from system information is used. The UE may be configured with several carrier bandwidth parts, of which only one may be active on a given component carrier.

In the 3GPP LTE/LTE-A system, radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15\ \text{kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

FIG. 1 illustrates a slot structure available in a new radio access technology (NR).

To minimize data transmission latency, in a 5G new RAT, a slot structure in which a control channel and a data channel are time-division-multiplexed is considered.

In FIG. 1, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 1, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present disclosure, the DL control channel may be locally transmitted or distributively transmitted in a partial frequency band in a system band, i.e., a channel band.

In the NR system, DL and UL transmissions are organized into frames with a 10-ms duration, consisting of ten 1-ms subframes. In the NR system, a basic transmission unit is a slot. A slot duration includes 14 symbols with a normal CP or 12 symbols with an extended CP and scales in time as a function of a used sub-carrier spacing.

For each numerology and carrier, a resource grid of $N^{size,\mu}_{grid,x} * N^{RB}_{sc}$ subcarriers and $N^{subframe,\mu}_{symb}$ OFDM symbols is defined. The subscript x is DL or UL for downlink and uplink, respectively. $N^{RB}_{sc}$ is 12 as the number of subcarriers per resource block (RB). There is one resource grid per antenna port p, per subcarrier spacing configuration μ, and per transmission direction (DL or UL). The number of consecutive OFDM symbols per subframe is $N^{subframe,\mu}_{symb} = N^{slot}_{symb} * N^{subframe,\mu}_{slot}$. $N^{slot}_{symb}$ consecutive OFDM symbols are present in a slot and $N^{slot}_{symb}$ depends on a CP. For the subcarrier spacing configuration μ, slots are numbered $n^{\mu}_{s} \in \{0, \ldots, N^{subframe,\mu}_{slot}-1\}$ in ascending order within a subframe where $N^{subframe,\mu}_{slot}$ is the number of slots within a subframe. Each element in the resource grid for antenna port p and subcarrier spacing configuration μ is called a resource element and is uniquely identified by $(k,l)_{p,\mu}$ where k is an index in the frequency domain and l refers to a symbol position in the time domain relative to a reference point. The resource element $(k,l)_{p,\mu}$ corresponds to a demodulation symbol $a^{(p,\mu)}_{k,l}$.

For more details of a slot structure of the NR system, reference is made to 3GPP TS 38.211 and 3GPP TS 38.300.

<Analog beamforming>

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present disclosure, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i.e., millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ, (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. A RACH resource allocation method and a resource use method of the BS according to the present disclosure, which will be described later, are proposed considering restrictions caused by the analog BF or hybrid BF characteristic.

<Hybrid Analog Beamforming>

Figure 2:
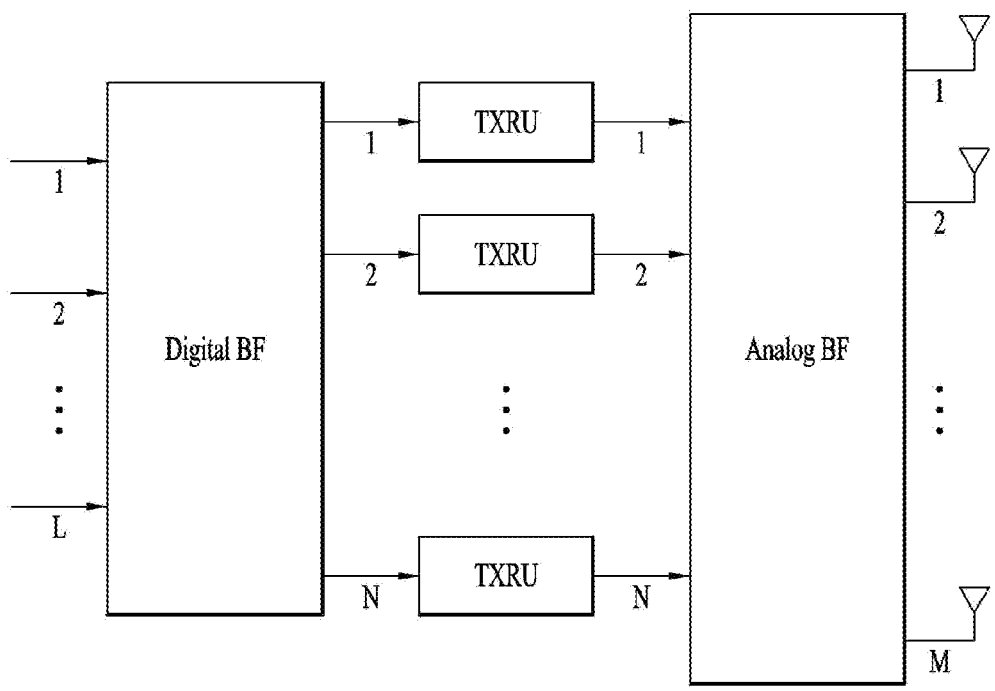
FIG. 2 abstractly illustrates transceiver units (TXRUs) and a hybrid beamforming structure in terms of physical antennas.

FIG. 2 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 2, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 3:
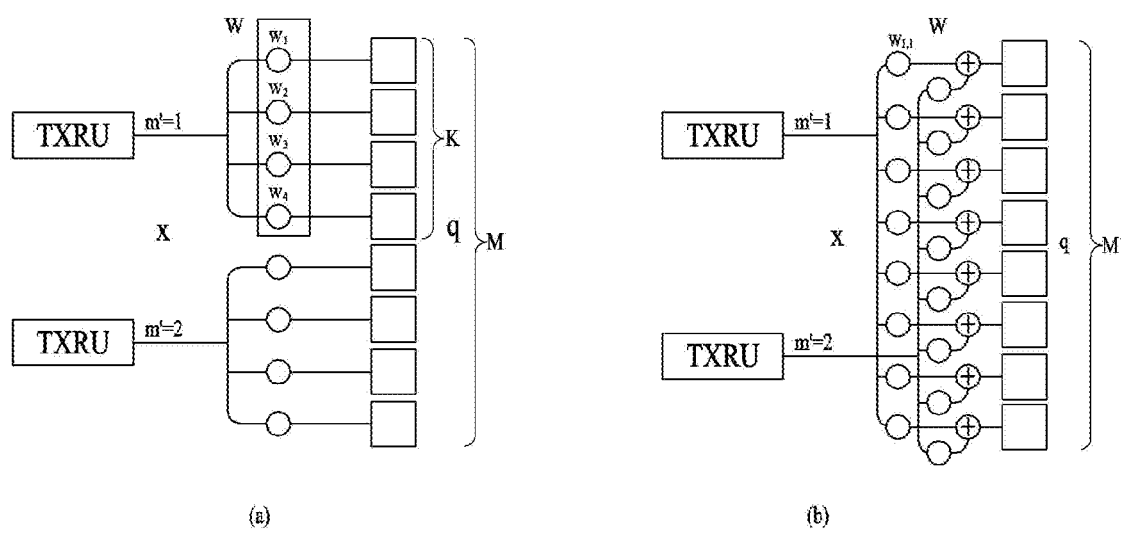
FIG. 3 illustrates options of a TXRU virtualization model.

FIG. 3 illustrates options of a TXRU virtualization model. In particular, FIG. 3 illustrates a method for connecting TXRUs to sub-arrays. The TRXU virtualization model defines a relation between signals of the TXRUs and signals of antenna elements. In a sub-array connection model of FIG. 3(a), one TXRU is connected only to antenna elements having the same polarization and in a sub-array connection model of FIG. 3(b), one TXRU is connected to all antenna elements. For a more detailed description of FIG. 3, refer to 3GPP TR 36.897.

In FIG. 3, q is a Tx signal vector in M co-polarized antenna elements, x is a TXRU signal vector in $M_{TXRU}$ TXRUs, and w and W are a wideband TXRU virtualization weight vector and matrix, respectively. In particular, W represents a phase vector multiplied by an analog phase shifter. That is, an analog beamforming direction is determined by W. Herein, a mapping relationship between CSI-RS antenna ports and TXRUs may be one-to-one or one-to-many.

Figure 4:
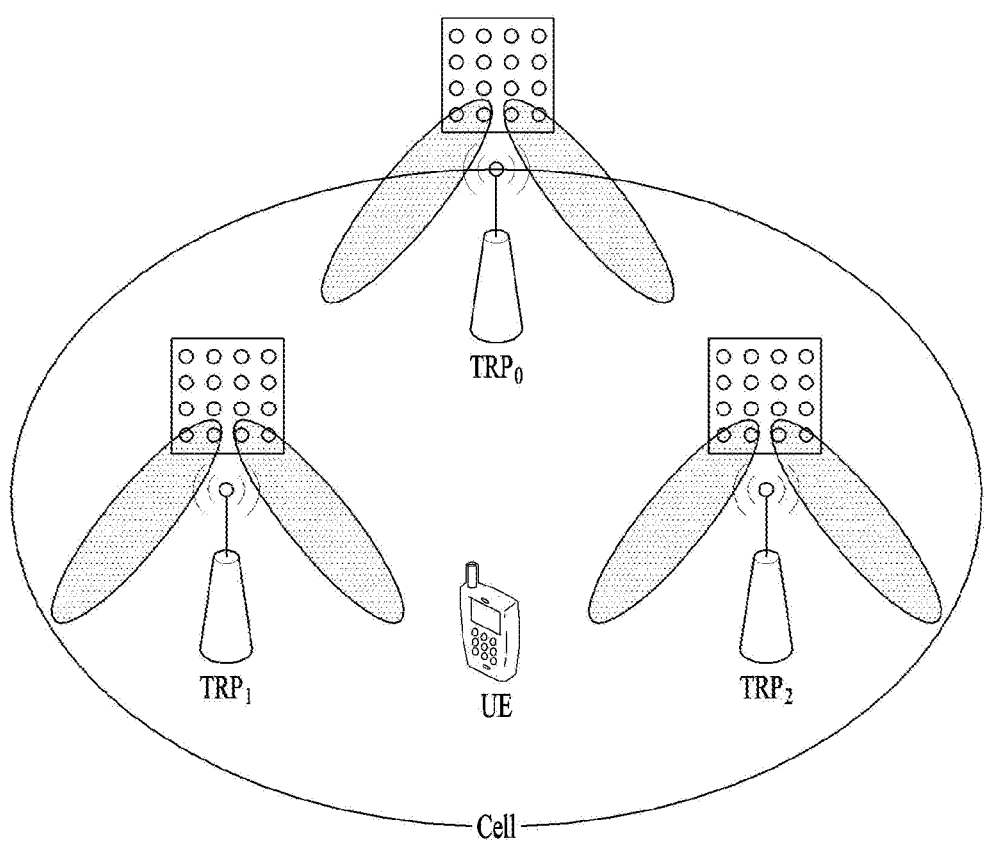
FIG. 4 illustrates a cell of a new radio access technology (NR) system.

FIG. 4 illustrates a cell of a new radio access technology (NR) system.

Referring to FIG. 4, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present disclosure, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present disclosure, a beam index may be interpreted as an SS block index.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

The 3GPP LTE(-A) system specifies that the UE may report channel state information (CSI) to the BS. The CSI collectively refers to information capable of indicating the quality of a radio channel (or a radio link) formed between the UE and antenna port(s) of the BS. For example, a rank indicator (RI), a precoding matrix indicator (PMI), and a channel quality indicator (CQI) correspond to the CSI. RI is rank information of a channel, indicating the number of streams that the UE may receive through the same time-frequency resource. RI is determined depending on long-term fading and, thus, RI is fed back to the BS from the UE with periodicity longer than that of PMI or CQI. PMI is a value in which a spatial characteristic of a channel is reflected, indicating a precoding index preferred by the UE based on a metric such as a signal-to-interference plus noise ratio (SINR). CQI is a value indicating the strength of a channel and implies a received SINR obtainable when the BS uses PMI. In the 3GPP LTE(-A) system, the eNB may configure a plurality of CSI processes for the UE and receive a report on CSI for each CSI process. Herein, the CSI process is defined by a CSI reference signal (CSI-RS) resource for quality measurement of a signal received from the eNB and a CSI interference measurement (CSI-IM) resource for interference measurement.

A network may periodically/aperiodically transmit a known signal to which each beam is applied in order to allow the UE to perform measurement for beams that are intended to be used in a corresponding cell (or beams available to the gNB). The known signal may include, for example, a measurement reference signal (MRS), a beam reference signal (BRS), or a beamformed CSI-RS. Hereinafter, the known signal will be referred to as the BRS for convenience of description. The UE may select a Tx beam of the gNB suitable for the UE through measurement of the BRS. Even in the case of considering an Rx beam of the UE, the UE may perform measurement using different UE Rx beams and select beam combination(s) considering the Tx beam of the gNB and the Rx beam of the UE. After such a procedure is performed, a Tx-Rx beam association of the gNB and the UE may be explicitly or implicitly determined. Network decision based beam association or UE decision based beam association may be performed.

The network decision based beam association may be performed as follows. The network may instruct the UE to report upper X Tx-Rx beam combinations based on a result of measurement. In this case, the UE may report a predefined number of beam combinations, a signaled number of beam combinations by the network (through higher layer signaling, etc.), or all beam combinations of measured results exceeding a specific threshold. The specific threshold may be predefined or may be signaled by the network. If decoding performance is different for each UE, categories considering decoding performance of the UE may be defined and a threshold for each category may be defined. A report on beam combinations may be periodically and/or aperiodically performed by instruction of the network. Alternatively, an event-triggered report may be performed if a previous report result and a current measurement result are changed by a predetermined level or more. The predetermined level may be predefined or may be signaled by the network (through higher layer signaling etc.). The UE may report (one or multiple) beam associations determined by the above-mentioned method. If a plurality of beam indexes is reported, a priority per beam may be assigned. For example, the UE may report the beam associations to be interpreted by the network in the form of a first preferred beam, a second preferred beam, and the like.

In a mobile communication system, since the gNB and the UE perform communication in a state of being physically separated, the gNB and the UE need to equalize a system frequency (e.g., a carrier frequency or a sampling frequency) and time (e.g., a slot index or a symbol boundary). To this end, the UE primarily requires a procedure of searching for a carrier frequency and an OFDM symbol boundary in a physical channel stage (i.e., a physical layer) and the gNB transmits an RS to help the UE measure a carrier frequency offset and the OFDM symbol boundary.

In an NR system, which is currently under discussion, the bandwidth of the system is variable and the bandwidth of a UE may differ according to UEs. The bandwidth of a high-frequency band used in the NR system is expected to be much larger than that of a frequency band used in the LTE/LTE-A system. For this reason, the UE generally operates by setting the bandwidth thereof to the bandwidth of a synchronization signal in an initial access stage. Thereafter, the UE completes time-tracking and frequency-tracking procedures until the UE camps on the system and performs a stable RACH procedure. For time and frequency tracking, an RS for time and frequency tracking should be defined. Generally, a synchronization signal (SS) block may be most widely used as the RS for time and frequency tracking.

However, in a broadband and multi-beam environment, a narrow band signal such as the SS block is used as the RS for time and frequency tracking. If the UE performs transmission/reception in a broad band, the resolution of time tracking remarkably appears and then system performance may be degraded when the length of a cyclic prefix (CP) used to prevent inter-symbol interference in an OFDM system is short. To prevent this phenomenon, the length of the CP may be set to be larger than a multi-path delay that may occur in a channel environment. However, a CP longer than the multi-path delay may degrade the efficiency of the system. To solve this problem and raise time-tracking resolution and frequency-tracking accuracy, a time and frequency tracking reference signal (TFRS) transmitted in a broad band needs to be defined. TFRS is also referred to as TRS. The present disclosure proposes an RS to help the UE perform time and frequency tracking in a broad band.

* Method 1) Periodic TFRS through SS Block Duration

Figure 5:
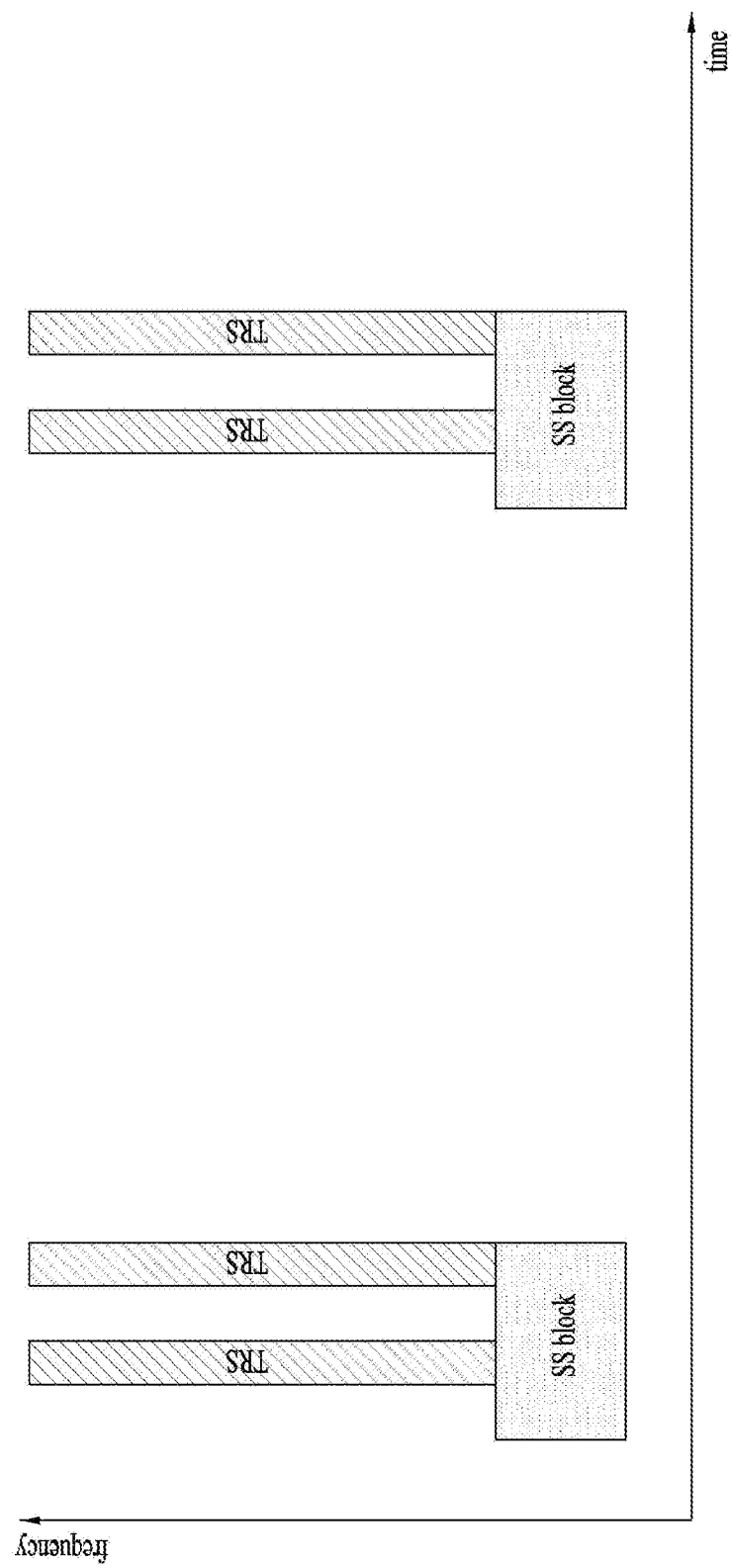
FIG. 5 illustrates a method of transmitting a time and frequency tracking reference signal (TFRS) according to the present disclosure.

FIG. 5 illustrates a method of transmitting a time and frequency tracking reference signal (TFRS) according to the present disclosure. In particular, in FIG. 5, the TFRS is multiplexed with an SS block and then transmitted.

In the NR system, the SS block is periodically transmitted so that the UE may perform cell detection, RSRP measurement for mobility, time and frequency tracking, system information reception, etc. The SS block is transmitted in each beam direction to secure cell coverage in the multi-beam environment. Therefore, as illustrated in FIG. 5, the gNB may perform TFRS transmission through a time duration in which the SS block is transmitted in order to periodically transmit the TFRS per beam. In this way, when the gNB transmits the TFRS through the SS block, the gNB need not additionally inform the UE of information on a relation between beam management and the TFRS (e.g., quasi co-location (QCL)). If large-scale properties of a channel over which symbols on one antenna port are conveyed can be inferred from a channel over which symbols on another antenna port are conveyed, the two antenna ports are said to QCLed. The large-scale attributes include one or more of delay spread, Doppler spread, Doppler shift, average gain, average delay, and spatial Rx parameters.

The SS block may be composed of various signals. For example, SSs (e.g., PSS and SSS) and a PBCH are discussed as the most representative signals to be included in the SS block. In general, since the PSS and the SSS are used for cell detection and neighbor cell measurement, it is difficult for the TFRS to be transmitted through an SS area (e.g., OFDM symbol(s) to which the SSs are mapped) within the SS block. However, since the PBCH uses channel coding and has a structure transmitted several times over several slots, it is possible for the TFRS to be transmitted through a PBCH area (e.g., OFDM symbol(s) to which the PBCH is mapped) within the SS block. Considering this point, the TFRS with the following structures may be defined.

> The TFRS is transmitted outside the SS block band.

> In an SS (OFDM symbol) area within the SS block, the TFRS is transmitted outside the SS band, whereas, in a PBCH (OFDM symbol) area in the SS block, the TFRS is transmitted on a time-frequency resource including a PBCH band. If the TFRS is transmitted in the PBCH band within the SS block, the TFRS may also be used as a demodulation reference signal (DM-RS) for the PBCH. Alternatively, the DM-RS for the PBCH may be used as a part of the TFRS.

When the gNB operates in a broad band (i.e., the gNB deploys a cell operating in a broad band) and the UE accessing the gNB operates in a much broader band than a band of the SS block, the gNB may transmit data or a control message in a frequency band other than the SS block band in an SS block transmission time area. In this case, the TFRS may be transmitted as a DM-RS for the data or the control message transmitted in the SS block transmission (time) area. The TFRS may be used as a DM-RS for the data or control message transmitted in the SS block transmission (time) area. If the transmission frequency of the data or the control message is high, the TFRS may be transmitted only when the data or the control message is transmitted. However, the gNB may transmit only the TFRS even when there is no transmission of the data or the control message so as to meet the purpose of the TFRS.

When the TFRS is used as the DM-RS, the density of the TFRS in the frequency domain and time domain or the number of transmit antenna ports may differ when the data or the control message is transmitted and when the data or the control message is not transmitted. The TFRS density in the time domain may also differ according to whether the TFRS is used only for time tracking or is used for frequency tricking as well. For example, when the TFRS is used only for time tracking, the TFRS is transmitted on four resource elements (REs) per RB in one of OFDM symbols of the SS block and, when the TFRS is transmitted for frequency tracking as well, the TFRS is transmitted in two symbols among OFDM symbols of the SS block and is transmitted on 4 REs per RB in the first symbol of the two symbols and 4 REs per RB in the second symbol of the two symbols.

Although the TFRS may be transmitted in each SS block (i.e., at every transmission time of the SS block), the TFRS may be transmitted through a partial SS block (i.e., at a partial transmission timing of the SS block) or may be transmitted only in a part of beams according to the locations of UEs in a service area of the gNB, in order to reduce system overhead caused by transmission of the TFRS. When the TFRS is transmitted only at a partial transmission timing or only in a part of beams, a method of informing the UE of transmission of the TFRS may be variously defined. For example, the UE may be aware that the TFRS is transmitted by one of the following methods.

> The UE determines whether the TFRS is present through blind detection. According to this method, since the TFRS only needs to be transmitted in a bandwidth of the TFRS, system overhead does not occur but TFRS performance may be deteriorated upon occurrence of false alarm.

> The presence or absence of the TFRS and resource allocation information for an SS block transmission area are dynamically notified through DCI. That is, for a specific SS block transmission area, whether the TFRS is present in the specific SS block transmission area and in what form the TFRS is present are indicated by the DCI. According to this method, system overhead and UE complexity are increased but radio resources may be efficiently used due to increase in flexibility of resource utilization.

> The UE is semi-statically notified of transmission or non-transmission of the TFRS and resource allocation information through an RRC connection message (e.g., RRC connection setup message). According to this method, system overhead is small and the TFRS may be variably transmitted depending on whether the UE is present in each beam. That is, even if the gNB configures the TFRS, the gNB may or may not transmit the TFRS according to whether the UE is present in each beam in a corresponding beam direction.

> Transmission or non-transmission of the TFRS and resource allocation information are semi-statically broadcast to UE(s) in a service area of the gNB through system information. According to this method, there is little system overhead but it is difficult to variably manage radio resources.

> Candidates of a TFRS transmission resource may be signaled through an RRC connection message or system information and whether the TFRS is actually transmitted may be signaled to the UE through the DCI or may be discerned by the UE through blind detection.

\* Method 2) TFRS in Area Other than SS Block Duration

The present disclosure proposes transmitting the TFRS using a CSI-RS for beam management (BM) and setting a CSI-RS used as the TFRS to have higher density than the CSI-RS for BM.

Figure 6:
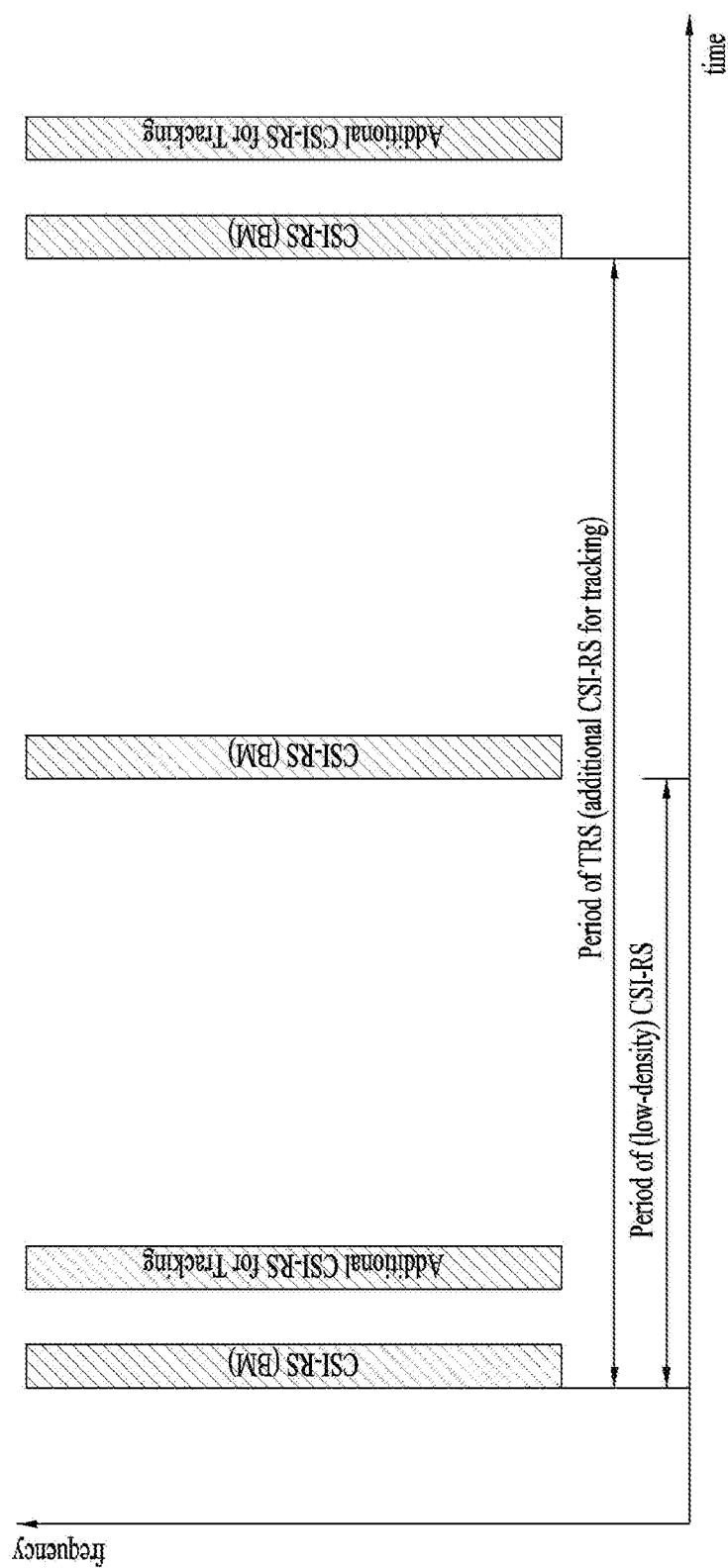
FIGS. 6, 7 and 8 illustrate other methods of transmitting the TFRS according to the present disclosure.
Figure 7:
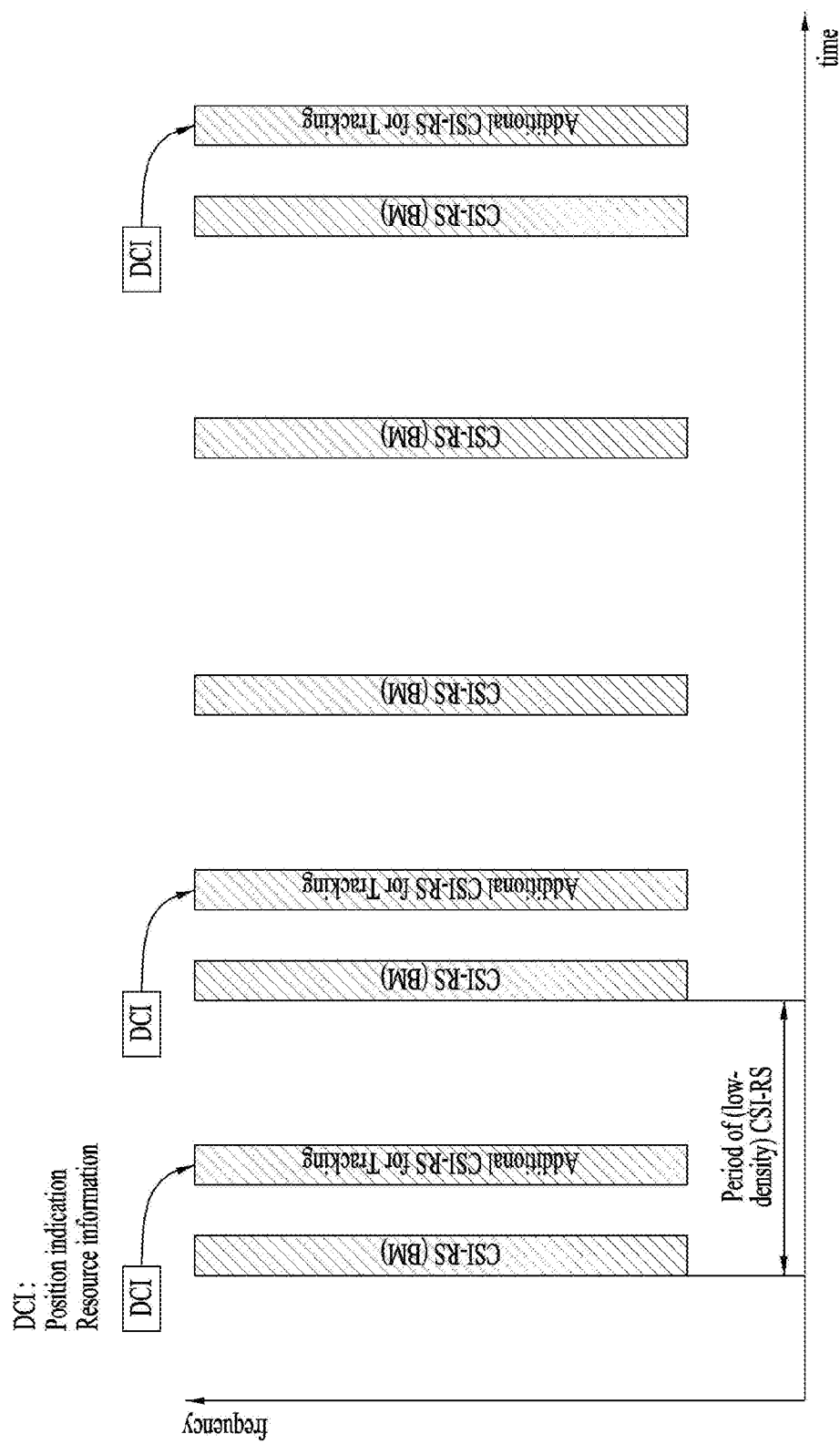
Figure 8:
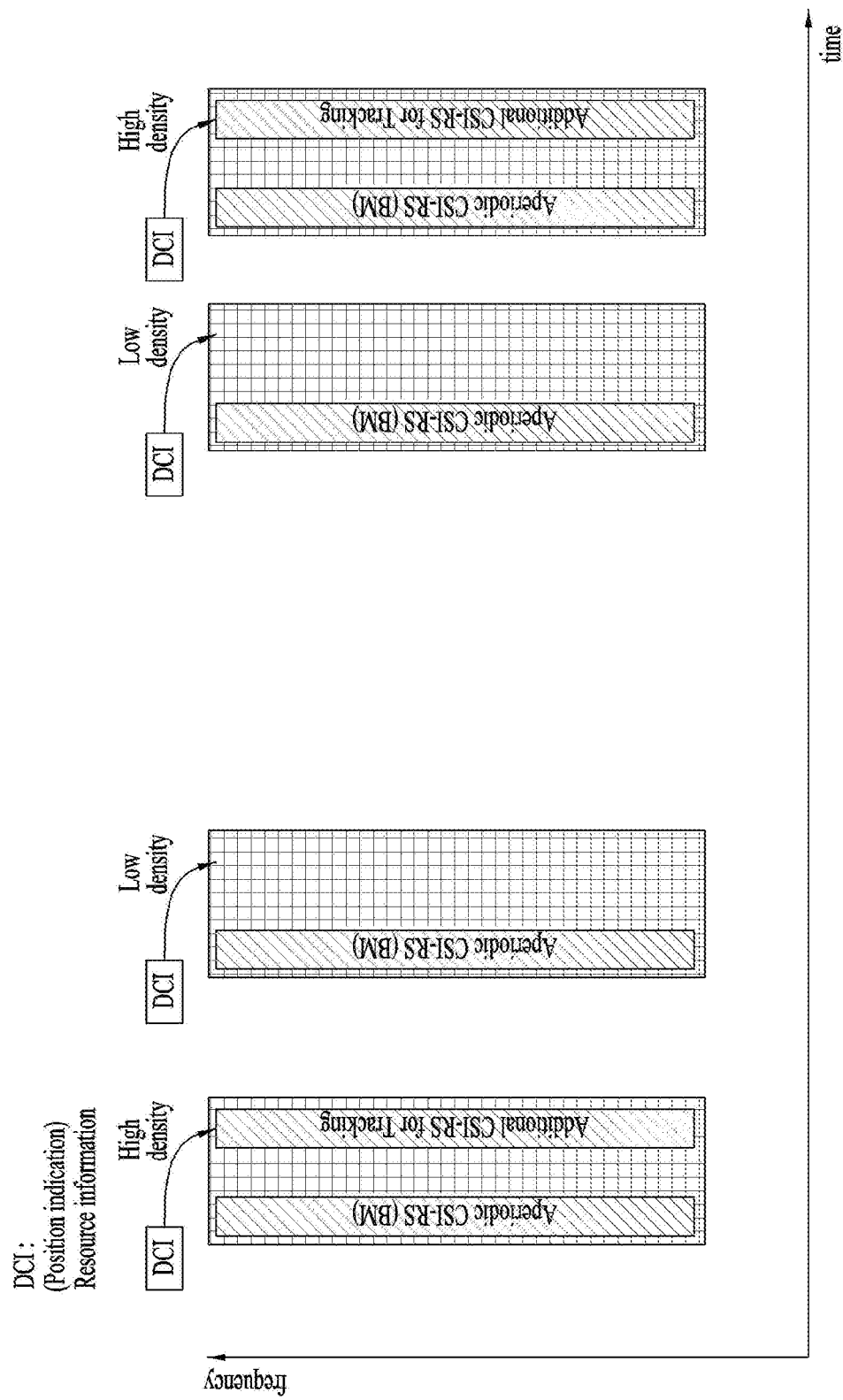

FIGS. 6, 7 and 8 illustrate other methods of transmitting the TFRS according to the present disclosure. In particular, FIGS. 6 and 7 illustrate a periodic TFRS and FIG. 8 illustrates an aperiodic TFRS.

\*\* Method 2-1) Periodic TFRS in Area Other than SS Block Duration

If a periodic CSI-RS for beam management (BM) is defined, since the CSI-RS for BM also demands wideband transmission and transmission per beam, which are characteristics demanded by the periodic TFRS, the two RSs have the same characteristics. However, since the purpose of using the TFRS is to cause the UE to obtain a path profile configuring a channel for time tracking, a signal having a low density on a frequency axis, such as the periodic CSI-RS for BM, may not be used for time tracking. In consideration of this point, the present disclosure proposes that the periodic CSI-RS for BM be transmitted at a high density on frequency and used as the TFRS. Therefore, the CSI-RS used as the TFRS may be configured to include the CSI-RS for BM. Referring to FIG. 6 or 7, the present disclosure defines the periodic CSI-RS for BM as a low-density CSI-RS and a high-density CSI-RS according to a used purpose. The low-density CSI-RS is used for BM (refer to "CSI-RS (BM)" in FIG. 6 or 7) and an additional CSI-RS for tracking (refer to "Additional CSI-RS for Tracking" in FIG. 6 or 7) is added to the low-density CSI-RS and used as the TFRS, i.e., for tracking. The network/gNB may configure the CSI-RS as a high-density CSI-RS and then transmit the CSI-RS so that the UE may use the high-density CSI-RS as the TFRS. Herein, the high density basically refers to density on the frequency axis. However, in order to allow the UE to use the CSI-RS for frequency tracking, the high density may imply that density on the time axis is raised or the number of (OFDM) symbols having the CSI-RS is increased. Since the TFRS present in two or more OFDM symbols is required to perform frequency tracking, the TFRS may be composed of a CSI-RS for BM and a CSI-RS added for tracking. That is, referring to FIG. 6 or FIG. 7, the UE may perform frequency tracking using the "CSI-RS (BM)" and "Additional CSI-RS for Tracking", which are adjacent to each other. That is, the periodic CSI-RS configured/allocated for the TFRS may have a higher density than the periodic CSI-RS for BM at least in the frequency domain. When the TFRS is used for frequency tracking, the periodic CSI-RS configured/allocated for the TFRS may have a higher density than the periodic CSI-RS for BM even in the time domain. Herein, the high density in the frequency domain may imply that the number of subcarriers to which the CSI-RS is mapped in a frequency band of a certain size is large. The high density in the time domain may imply that there are a large number of OFDM symbols to which the CSI-RS is mapped in a time period of a certain size. For example, the CSI-RS for tracking may be configured/allocated such that the number of REs to which the CSI-RS is mapped in a frequency band of a certain size within OFDM symbols in which the CSI-RS for tracking is present is larger than the number of REs to which the CSI-RS is mapped in the frequency band of the same size within OFDM symbols in which the CSI-RS for BM is present. If the CSI-RS for tracking is also used for frequency tracking, the CSI-RS for tracking may be configured/allocated such that the number of OFDM symbols to which the CSI-RS is mapped in a time duration of a certain size within OFDM symbols in which the CSI-RS for tracking is present is larger than the number of OFDM symbols to which the CSI-RS is mapped in the time duration of the same size within OFDM symbols in which the CSI-RS for BM is present. The high-density CSI-RS for the TFRS may be configured by increasing the number of OFDM symbols to which the CSI-RS for BM is mapped. For example, a CSI-RS resource for time tracking may be configured by adding a CSI-RS RE to a low-density CSI-RS RE in the frequency domain and a CSI-RS resource for frequency tracking may be configured by adding a CSI-RS RE to a low-density CSI-RS RE in the time domain.

In this way, when the network/gNB periodically transmits the TFRS and beams of the network/gNB has a hierarchical structure using the SS block and the CSI-RS, if the network/gNB informs the UE of a relation between the TFRS and the SS block, complexity of BM and complexity of time and frequency tracking may be reduced. In addition, the UE may use path profile information per beam as an optimization parameter at a UE receiver for channel estimation or MIMO detection performed after BM and time and frequency tracking.

The gNB allocates the periodic CSI-RS for BM through an RRC message and, at the same time, allocates the TFRS. If transmission timings of the two CSI-RSs are equal, the gNB transmits the TFRS and uses the TFRS for BM. That is, the gNB allocates the periodic CSI-RS for tracking and, if the periodic CSI-RS for BM is equal in transmission timing to the CSI-RS for tracking, the gNB transmits a high-density CSI-RS for tracking and uses the high-density CSI-RS for tracking as the TFRS and for BM as well. The high-density CSI-RS for tracking may be configured to include a low-density CSI-RS for BM and an additional CSI-RS.

While configuring a time-frequency resource for the periodic CSI-RS through the RRC message, the gNB may inform the UE of periodicity of a low density (i.e., periodicity of the low-density periodic CSI-RS) and periodicity of a high density (i.e., periodicity of the high-density periodic CSI-RS), for the same resource (i.e., the same OFDM symbol and frequency band). If the transmission timing of the low-density periodic CSI-RS is equal to the transmission timing of the high-density periodic CSI-RS, the gNB may transmit the high-density periodic CSI-RS.

The gNB configures a time-frequency resource for the periodic CSI-RS through the RRC message and basically transmits the CSI-RS at a low density for BM on the time-frequency resource. As illustrated in FIG. 7, the gNB may dynamically inform the UE that the high-density CSI-RS is transmitted through a physical signal or a physical message such as the DCI at the transmission timing of the TFRS. Referring to FIG. 7, the DCI includes a location indication to which the high-density CSI-RS is transmitted (e.g., the location of an OFDM symbol in which an additional CSI-RS is transmitted) and resource information (e.g., the density of REs of the high-density CSI-RS or bandwidth in which the high-density CSI-RS is present).

The TFRS should be transmitted per beam so that it is better for the gNB to transmit the TFRS per beam as a localized type (i.e., transmission of the TFRS within a short time) while performing beam sweeping in each slot over several slots, for efficient resource use and eNB scheduling efficiency. That is, the gNB may transmit the TFRS per beam while changing a Tx beam direction in a slot. In this case, data or a control channel cannot be transmitted in the form of a normal slot in a slot in which the gNB performs beam sweeping. Therefore, it is desirable to transmit DL data or a control channel having a short slot length in the form of a mini slot in the slot in which the gNB performs beam sweeping or to transmit a channel requiring beam diversity. In order for the UE to receive the channel having a short slot length or the channel requiring beam diversity, the gNB needs to transmit the DM-RS. The TFRS may be used as the DM-RS because the TFRS has density similar to density on frequency required by the DM-RS. However, since the same precoding should be applied to all RBs having TFRS in order to allow the UE to obtain a path profile through the TFRS, the channel transmitted through this slot having a short slot length (i.e., a slot in which the TFRS is transmitted in one beam direction) may be transmitted by a time diversity scheme such as space frequency block coding (SFBC) or may be transmitted by a scheme using the same precoding over all bands. If the gNB intends to use precoding per subband, the gNB may transmit the TFRS and a corresponding data channel by a scheme of indicating an index of a precoding matrix applied to a data channel through the DCI, without applying precoding to the TFRS, similarly to a transmission scheme using the CRS of LTE.

If the gNB informs the UE of a beam index for a CSI-RS (time-frequency) resource and connection information (i.e., association information) with a beam, the UE may obtain path profile information per beam using the beam index and the connection information and use the path profile information per beam as an optimization parameter at the UE receiver for later channel estimation or MIMO detection.

** Method 2-2) Aperiodic TFRS in Area Other than SS Block Duration

FIG. 8 illustrates another example of multiplexing a TFRS with an SS block.

In a multi-beam environment, the TFRS should be transmitted per beam. Therefore, if the TFRS is transmitted periodically, there is a problem that there is a restriction on the scheduling procedure of the gNB or a restriction on use of resources when the gNB performs beam sweeping for TFRS transmission in one slot. To avoid this problem, an aperiodic TFRS may be defined.

Although a DM-RS of a PDSCH may be used as the aperiodic TFRS in terms of a resource allocation scheme, i.e., in terms of which resources will be used for time/frequency tracking, in the case in which the PDSCH is transmitted in a narrow bandwidth, an original purpose of the TFRS may not be achieved and it is difficult for another UE to use the DM-RS of the PDSCH (hereinafter, a PDSCH DM-RS). Therefore, the PDSCH DM-RS is not suitable for the aperiodic TFRS. The aperiodic CSI-RS for BM is similar to the PDSCH DM-RS in that the aperiodic CSI-RS for BM is also aperiodic and it is difficult to allocate the aperiodic CSI-RS for a broad band. However, since the TFRS has a purpose of causing UE(s) to obtain the path profile configuring a channel for time tracking, a signal having a low density on frequency, such as the aperiodic CSI-RS for BM, cannot be used for time tracking. Considering this point, the present disclosure proposes transmitting the aperiodic CSI-RS for BM at a high density on frequency to use the aperiodic CSI-RS for BM as the TFRS. Herein, the high density basically refers to density on the frequency axis. However, in order to allow the UE to use the CSI-RS for frequency tracking, the high density may imply that density is increased on the time axis or the number of (OFDM) symbols having a CSI-RS is increased.

Referring to FIG. 8, if the gNB aperiodically transmits a CSI-RS to the UE, the aperiodic CSI-RS may be typically indicated through the DCI. In this case, the gNB informs the UE that the aperiodic CSI-RS is transmitted through the DCI and, at the same time, indicates the density of the aperiodic CSI-RS so that the UE may use the aperiodic CSI-RS for BM as the TFRS. For example, referring to FIG. 8, for a time-frequency region of a specific size, the gNB may indicate whether the aperiodic CSI-RS in the time-frequency resource region is low density or high density. As another method, the gNB may pre-inform the UE of information about a slot in which the TFRS may be transmitted through an RRC message. If a timing when the gNB transmits the aperiodic CSI-RS is a slot pre-configured through the RRC message, the gNB transmits the aperiodic CSI-RS in the corresponding slot as the TFRS, i.e., the gNB transmits a high-density CSI-RS. The UE recognizes that the TFRS (i.e., high-density CSI-RS) has been transmitted in the slot and performs measurement for fine time and frequency tracking in addition to BM or measurement for CSI feedback.

In this case, if the gNB informs the UE of a beam index for a CSI-RS resource and connection information with a beam, the UE may obtain path profile information per beam using the beam index and the connection information and use the path profile information per beam as an optimization parameter at the UE receiver for later channel estimation or MIMO detection. If the TFRS is transmitted in a specific slot and data or a control channel is transmitted in the specific slot, the TFRS may be used as a DM-RS or may be used in the form of supporting the DM-RS (i.e., may be used as an additional DM-RS in a state in which the DM-RS is present), similarly to the case of periodic TFRS transmission. That is, the aperiodic TFRS may be used as the DM-RS for the control or data channel, like the periodic TFRS described in Method 2-1.

Figure 9:
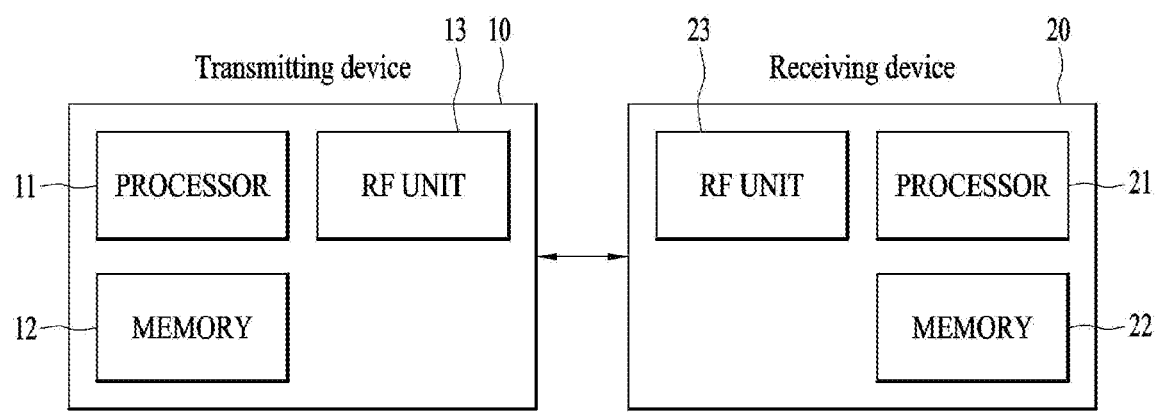
FIG. 9 is a block diagram illustrating elements of a transmitting device 10 and a receiving device 20 for implementing the present disclosure.

FIG. 9 is a block diagram illustrating elements of a transmitting device 10 and a receiving device 20 for implementing the present disclosure.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present disclosure.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present disclosure. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present disclosure is implemented using firmware or software, the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present disclosure, the RF units 13 and 23 may support Rx BF and Tx BF. For example, in the present disclosure, the RF units 13 and 23 may be configured to perform the function illustrated in FIG. 2 or FIG. 3.

In the embodiments of the present disclosure, a UE operates as the transmitting device 10 in UL and as the receiving device 20 in DL. In the embodiments of the present disclosure, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

The gNB processor of the present disclosure may configure a TFRS according to any one of the methods proposed in the present disclosure. The gNB processor may control the gNB RF unit to transmit configuration information about the TFRS. The UE processor may be aware of a time-frequency resource on which the TFRS is located based on the configuration information received by the UE RF unit. The UE processor may perform measurement for at least time tracking by detecting the TFRS based on the configuration information. The UE processor may perform measurement for frequency tracking based on the TFRS. The UE processor may perform measurement for BM using the TFRS.

The gNB processor or the UE processor of the present disclosure may be configured to apply the present disclosure on a cell operating in a high frequency band of 6 GHz or above in which analog or hybrid beamforming is used.

As described above, the detailed description of the preferred embodiments of the present disclosure has been given to enable those skilled in the art to implement and practice the invention. Although the invention has been described with reference to exemplary embodiments, those skilled in the art will appreciate that various modifications and variations can be made in the present disclosure without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present disclosure are applicable to a BS, a UE, or other devices in a wireless communication system.

The invention claimed is:

1. A method of receiving a reference signal by a user equipment (UE) in a wireless communication system, the method comprising:
receiving low-density configuration information regarding a low-density channel state information reference signal (CSI-RS) for beam management and high-density configuration information regarding a high-density CSI-RS for time tracking,
wherein the high-density CSI-RS has a higher density at least in a frequency domain than the low-density CSI-RS, and
wherein the high-density CSI-RS configuration information includes information regarding a slot in which the high-density CSI-RS is present;
receiving downlink control information including information indicating a transmission of an aperiodic CSI-RS; and
based on the transmission of the aperiodic CSI-RS occurring in the slot indicated by the high-density CSI-RS configuration information, receiving the high-density CSI-RS as the periodic CSI-RS.

2. The method of claim 1, further comprising:
performing frequency tracking using the high-density CSI-RS, wherein the high-density CSI-RS has a higher density in a time domain than the low-density CSI-RS.

3. The method of claim 1, wherein the high-density CSI-RS is a periodic CSI-RS.

4. A method of transmitting a reference signal by a base station (BS) in a wireless communication system, the method comprising:
transmitting low-density configuration information regarding a low-density channel state information reference signal (CSI-RS) for beam management and high-density configuration information regarding a high-density CSI-RS for time tracking,
wherein the high-density CSI-RS has a higher density at least in a frequency domain than the low-density CSI-RS, and
wherein the high-density CSI-RS configuration information includes information regarding a slot in which the high-density CSI-RS is present;
transmitting downlink control information including information indicating a transmission of an aperiodic CSI-RS; and
based on the transmission of the aperiodic CSI-RS occurring in the slot indicated by the high-density CSI-RS configuration information, transmitting the high-density CSI-RS as the periodic CSI-RS.

5. The method of claim 4, wherein the high-density CSI-RS has a higher density in a time domain than the low-density CSI-RS.

6. The method of claim 4, wherein the high-density CSI-RS is a periodic CSI-RS.

7. A user equipment (UE) for receiving a reference signal in a wireless communication system, the UE comprising,
a radio frequency (RF) transceiver;
a processor;
a memory storing at least one program that causes the processor to perform operations comprising:
receiving low-density configuration information regarding a low-density channel state information reference signal (CSI-RS) for beam management and high-density configuration information regarding a high-density CSI-RS for time tracking,
wherein the high-density CSI-RS has a higher density at least in a frequency domain than the low-density CSI-RS, and
wherein the high-density CSI-RS configuration information includes information regarding a slot in which the high-density CSI-RS is present;

receiving downlink control information including information indicating a transmission of an aperiodic CSI-RS; and based on the transmission of the aperiodic CSI-RS occurring in the slot indicated by the high-density CSI-RS configuration information, receiving the high-density CSI-RS as the periodic CSI-RS.

8. The UE of claim 7, wherein the UE further performs frequency tracking using the high-density CSI-RS and the high-density CSI-RS has a higher density in a time domain than the low-density CSI-RS.

9. The UE of claim 7, wherein the high-density CSI-RS is a periodic CSI-RS.

10. A base station (BS) for transmitting a reference signal in a wireless communication system, the BS comprising:
a radio frequency (RF)transceiver;
a processor; and
a memory storing at least one program that causes the processor to perform operations comprising:
transmitting low-density configuration information regarding a low-density channel state information reference signal (CSI-RS) for beam management and high-density configuration information regarding a high-density CSI-RS for time tracking, wherein the high-density CSI-RS has a higher density at least in a frequency domain than the low-density CSI-RS, and wherein the high-density CSI-RS configuration information includes information regarding a slot in which the high-density CSI-RS is present;

transmitting downlink control information including information indicating a transmission of an aperiodic CSI-RS; and based on the transmission of the aperiodic CSI-RS occurring in the slot indicated by the high-density CSI-RS configuration information, transmitting the high-density CSI-RS as the periodic CSI-RS.

11. The BS of claim 10, wherein the high-density CSI-RS has a higher density in a time domain than the low-density CSI-RS.

12. The BS of claim 10, wherein the high-density CSI-RS is a periodic CSI-RS.

* * * * *